United States Patent
Smith

(10) Patent No.: US 6,922,187 B2
(45) Date of Patent: Jul. 26, 2005

(54) METHOD AND APPARATUS FOR IMPLEMENTING A COMPACT PORTABLE COMPUTER SYSTEM

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 10/201,520

(22) Filed: Jul. 23, 2002

(65) Prior Publication Data

US 2004/0017405 A1 Jan. 29, 2004

(51) Int. Cl.[7] .................................................. G09G 5/00

(52) U.S. Cl. ....................... 345/168; 345/905; 348/836; 361/681; 361/682; 361/683

(58) Field of Search ......................... 345/156, 1.3, 157, 345/168, 173, 762, 763, 773, 905; 361/681–683; 348/863

(56) References Cited

U.S. PATENT DOCUMENTS

| | | | | |
|---|---|---|---|---|
| 6,229,693 B1 | * | 5/2001 | Karidis et al. | 361/681 |
| 6,266,236 B1 | * | 7/2001 | Ku et al. | 361/681 |
| 6,326,955 B1 | * | 12/2001 | Ditzik | 345/173 |
| 6,441,806 B1 | * | 8/2002 | Jaeger | 345/172 |
| 6,611,253 B1 | * | 8/2003 | Cohen | 345/168 |
| 6,614,422 B1 | * | 9/2003 | Rafii et al. | 345/168 |
| 6,657,853 B2 | * | 12/2003 | Oba et al. | 361/681 |
| 2002/0118175 A1 | * | 8/2002 | Liebenow et al. | 345/168 |
| 2002/0145847 A1 | * | 10/2002 | Crosby | 361/683 |
| 2003/0235452 A1 | * | 12/2003 | Kraus et al. | 400/472 |

* cited by examiner

*Primary Examiner*—Henry N. Tran
(74) *Attorney, Agent, or Firm*—Joan Pennington

(57) ABSTRACT

A method and apparatus are provided for implementing a compact portable computer system. The compact portable computer system includes a keyboard and a computer display disposed above and generally parallel to the keyboard. A pivot mechanism and a pair of supporting arms are coupled between the pivot mechanism and a respective one of the keyboard and computer display for adjustably positioning the computer display above the keyboard.

9 Claims, 5 Drawing Sheets

METHOD AND APPARATUS FOR IMPLEMENTING A COMPACT PORTABLE COMPUTER SYSTEM

FIELD OF THE INVENTION

The present invention relates generally to the data processing field, and more particularly, relates to a method and apparatus for implementing a compact portable computer system.

DESCRIPTION OF THE RELATED ART

Conventional laptops and notebook computers are all hinged at the rear and open at the back generally like a book. For the usual arrangement of today's laptop and notebook computers, the display screen pivots at the rear of a keyboard that lies in a horizontal plane. Due to space requirements with this conventional arrangement of laptops and notebook computers, some potential uses of the laptops and notebook computers are not possible or are significantly limited.

A need exists for a mechanism that is effective to reduce the amount of space needed to use a portable computer system. It is also desirable to provide such a mechanism that effectively reduces the space needed to use the portable computer system generally without interfering with the operation of the portable computer system. A need exists for an improved compact portable computer system.

SUMMARY OF THE INVENTION

A principal object of the present invention is to provide a method and apparatus for implementing a compact portable computer system. Other important objects of the present invention are to provide such method and apparatus for implementing a compact portable computer system substantially without negative effect and that overcome many of the disadvantages of prior art arrangements.

In brief, a method and apparatus are provided for implementing a compact portable computer system. The compact portable computer system includes a keyboard and a computer display disposed above and generally parallel to the keyboard. A pivot mechanism and a pair of supporting arms are coupled between the pivot mechanism and a respective one of the keyboard and computer display for adjustably positioning the computer display above the keyboard.

In accordance with features of the invention, an artificial hands/keyboard display program generates a window view of the keyboard with user finger positions in the computer display so that the location of a user's fingers can be identified before a key is pressed. Proximity sensors included in the keyboard keys capture the users finger positions relative to the keys on the keyboard.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
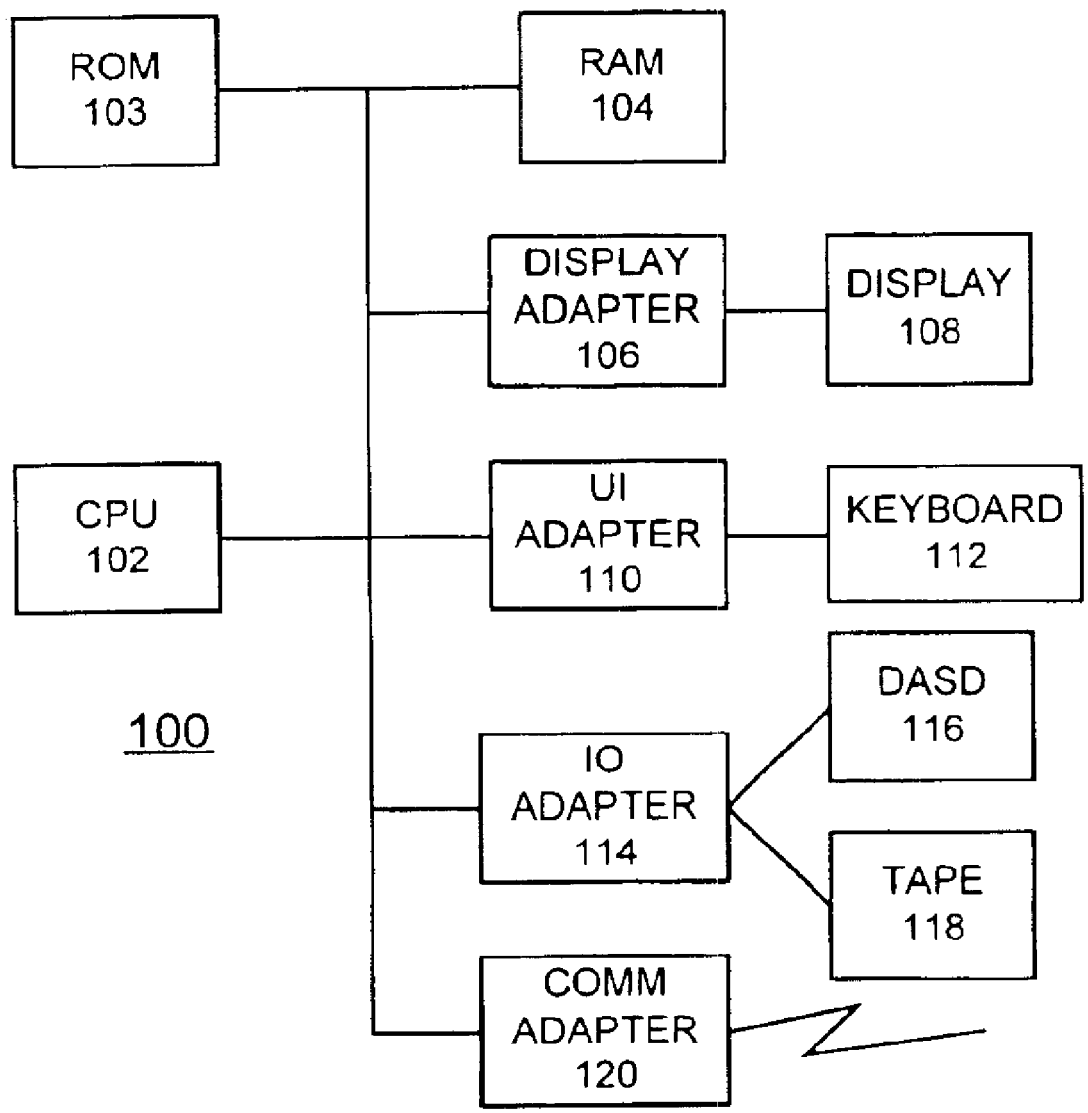
FIGS. 1A and 1B are block diagrams illustrating a computer system for implementing a compact portable computer system in accordance with the preferred embodiment.
Figure 1B:
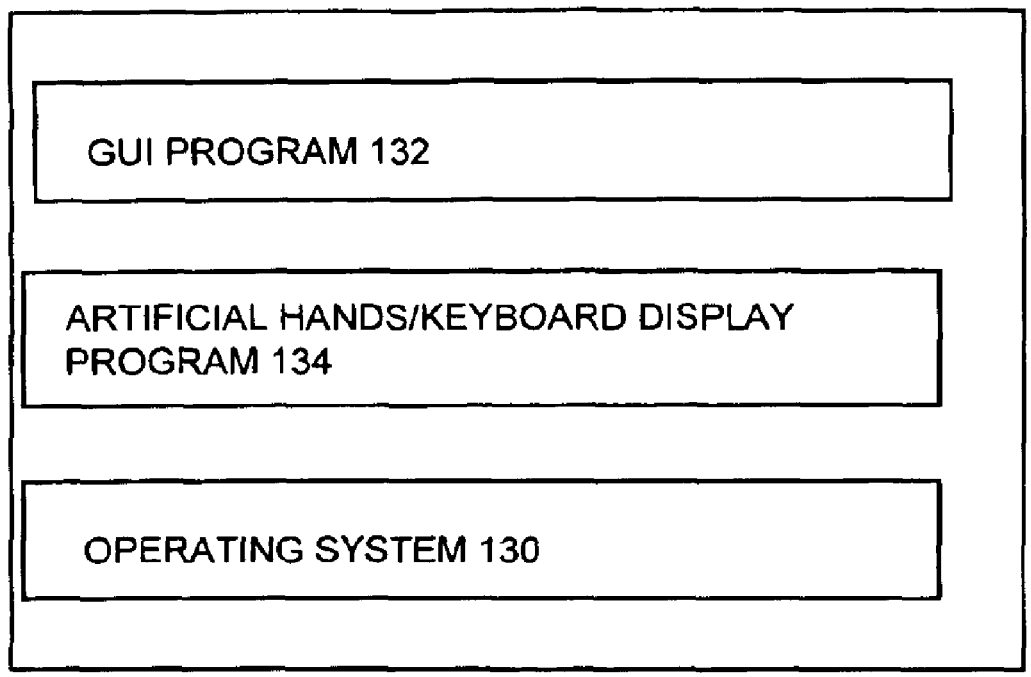

Having reference now to the drawings, in FIGS. 1A and 1B, there is shown a portable computer or data processing system generally designated by the reference character 100 for carrying out the compact computer operations of the preferred embodiment. As shown in FIG. 1A, the portable computer system 100 includes a central processor unit (CPU) 102, a read only memory 103, a random access memory 104, a display adapter 106 coupled to a display 108. CPU 102 is connected to a user interface (UI) adapter 110 connected to a keyboard 112 and to a pointer device (not shown). CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A. The portable computer system 100 can be used for various portable computer devices, such as notebook and laptop computers.

As shown in FIG. 1B, computer system 100 includes an operating system 130, a graphical user interface (GUI) program 132 and an artificial hands/keyboard display program 134 of the preferred embodiment. The GUI program 132 includes various computer programs that generate display screens.

In accordance with features of the preferred embodiment, the portable computer system 100 enables a more efficient use of space during operation as compared to conventional portable computer systems. The overall space requirements are reduced by the portable computer systems 100. The overall space required for a display 108 and keyboard 112 is reduced by positioning the display 108 generally directly above and roughly parallel to the keyboard 112. Artificial hands/keyboard display program 134 of the preferred embodiment enables the user to see a GUI display window of the positions of fingers, for example, identified as darkened keys relative to the keyboard 112.

In accordance with advantages of the present invention over existing portable notebook computers, the display 108 can be made to lie substantially in a horizontal plane, making use of the portable computer system 100 more natural, that is like reading a book. The table space required is reduced in the depth direction. This becomes very important when table depth is limited, for example, when a tray table on an airline supports the portable computer system 100. For many people, it is not necessary to view the keyboard 112 while typing, for example, touch typists. For many applications, only a trackpoint or other pointing device is needed so that a full keyboard takes up unnecessary space. For many applications, the keyboard/pointing devices are superfluous, for example, watching a DVD movie. Therefore, the invention contemplates an arrangement where the vertical space between the top of the keyboard 112 and the bottom of the display 108 can be made very small, that is the spacing is adjustable allowing the computer 100 to be used primarily as a display without the use of a keyboard 112. A touch pad or mouse/trackpoint can be made accessible, such as by incorporating the touch pad or mouse/trackpoint into the sides of the display or keyboard housing.

Figure 2:
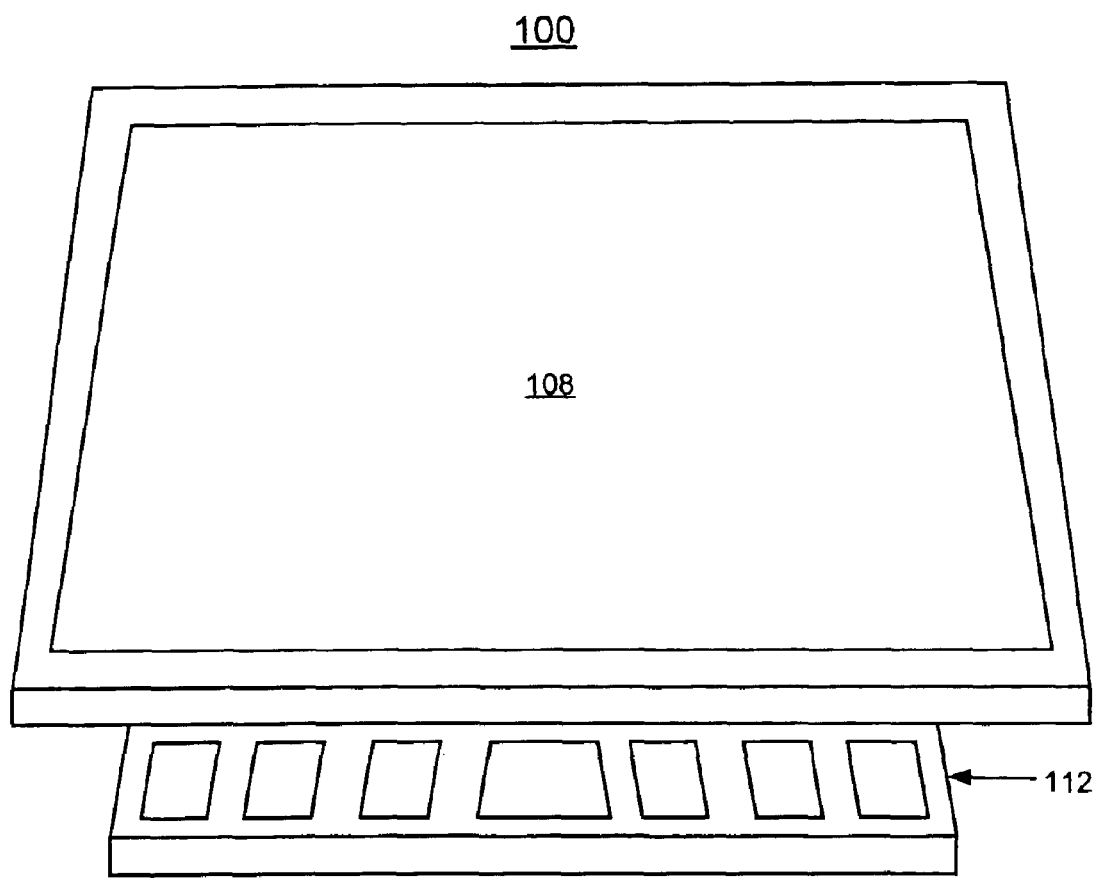
FIGS. 2 and 3 are diagrams illustrating an exemplary compact portable computer system in accordance with the preferred embodiment.
Figure 3:
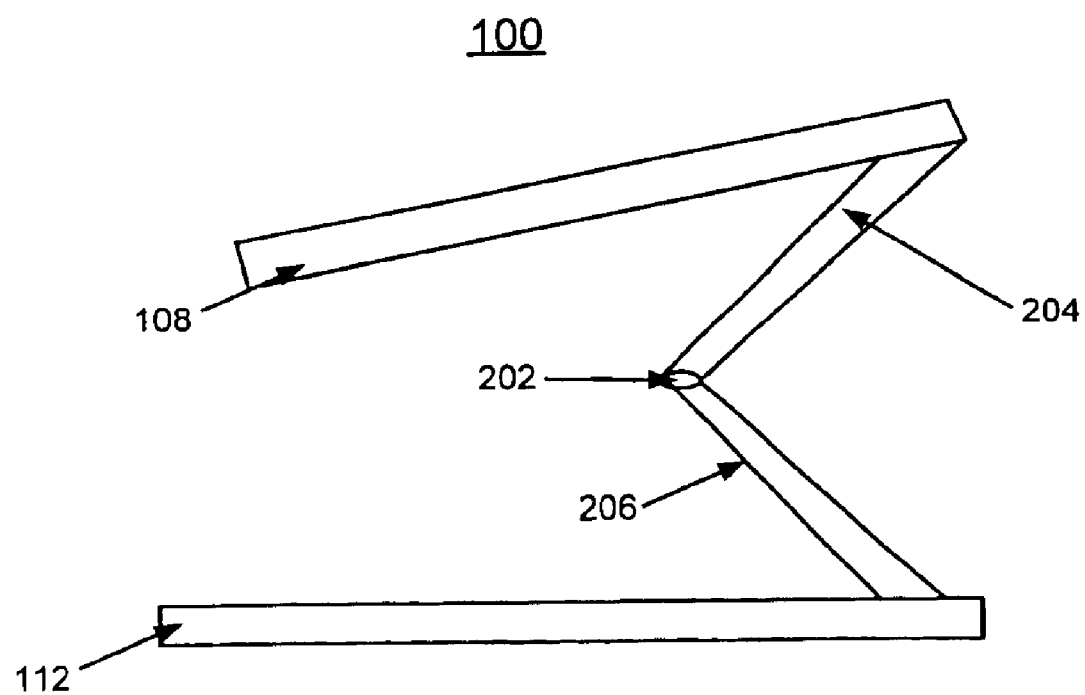

Referring now to FIGS. 2 and 3, there is shown an exemplary arrangement of the compact portable computer system 100 in accordance with the preferred embodiment.

The compact portable computer system 100 uses a conventional flat screen display 108 as found in most notebook computers. As shown, the display 108 lies physically above the keyboard 112. In the compact portable computer system 100, the flat screen display 108 is adjustably positioned spaced above a horizontal keyboard 112, for example, roughly five inches above the horizontal keyboard with multiple spacing adjustments possible.

The compact portable computer system 100 includes a full-size keyboard 112 and display 108 requiring minimal space during operation. FIG. 2 illustrates that the display 108 lies above the keyboard 112 and the display 108 lies in a plane generally parallel with the horizontal keyboard during operation.

As shown in FIG. 3, the compact portable computer system 100 includes a hinge or pivot mechanism 202 including a pair of supporting arms 204 and 206, respectively coupled to the display 108 and the keyboard 112. The pivot mechanism 202 and supporting arms 204 and 206 are adjusted to position the display 108 at a desired spacing above the keyboard 112.

Artificial hands/keyboard display program 134 of the preferred embodiment enables keyboard fingering to be shown, if desired, for example, in a display window on the display screen 108 so that the location of a user's fingers can be identified before a key is pressed. Artificial hands/keyboard display program 134 can include various options. For example, the position of the window on the flat screen display 108 displaying the real-time images of the user's hands and keyboard 112 can be made adaptive so that when a user pauses between keyboard entries, the window displaying the keyboard can slowly dissolve. When typing resumes or when finger motion is sensed by the proximity system, the window can reappear. Alternatively, the window may remain in a fixed position on the screen. The display of the keyboard in a window can be three dimensional with various selectable view angles or it can be shown as a simple two-dimensional outline with the position of fingers identified as darkened keys.

In accordance with features of the preferred embodiment, proximity sensors capture the users finger positions relative to the keys on the keyboard 112. The view of the keyboard 112 can be displayed in a window on the computer display 108 as a three dimensional image including artificial hands. The fingers on the artificial hands move as the user's fingers are detected by proximity sensors provided with the keyboard keys. In the simplest case, the keys on the keyboard 112 are shown in a simple two-dimensional view. When fingers are placed above the keys but not depressing the keys, the keys are shown darkened in the two-dimensional screen display generated by the artificial hands/keyboard display program 134.

Figure 4:
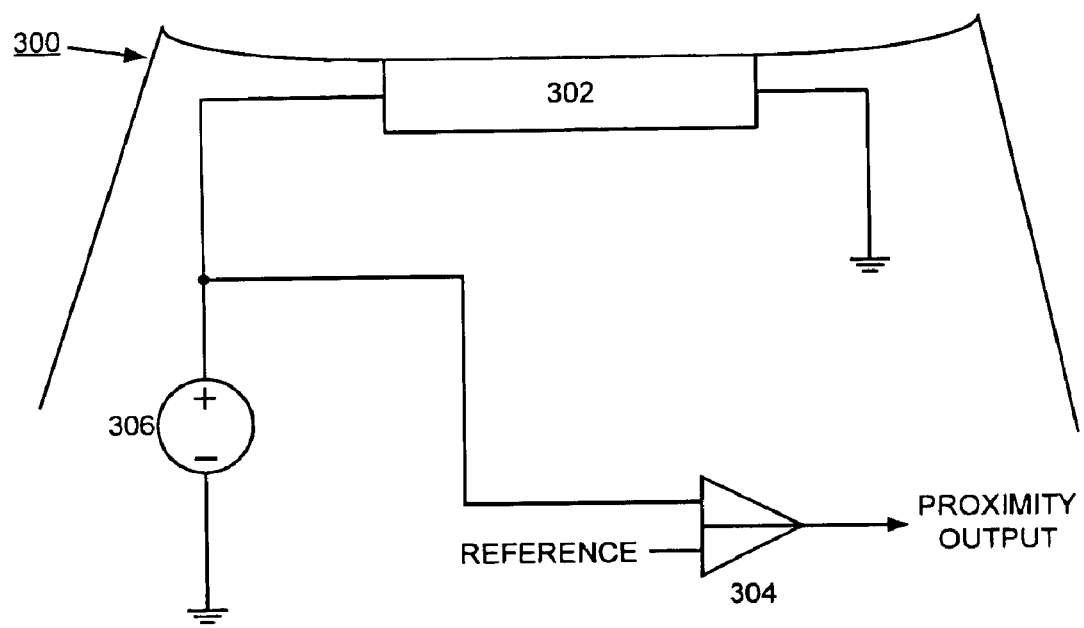
FIG. 4 is a diagram illustrating an exemplary proximity sensor of the compact portable computer system in accordance with the preferred embodiment.

Referring also to FIG. 4, there is shown an exemplary proximity sensor generally designated by the reference character 300 of the compact portable computer system 100 in accordance with the preferred embodiment. The keyboard 112 is made visible by using proximity sensing technology that is integrated into each proximity sensor key cap 300 on the keyboard including trackpoint buttons, and the like. Any one or combination of proximity sensing technologies can be used including: capacitance, optical, thermal, and pressure.

In FIG. 4, the exemplary key cap 300 uses a thermal sensing technology as shown. The key cap 300 includes a small self-heating sensor 302, such as a thermistor or thin film sensor, that is disposed generally flush with the top of the key cap as shown. An electronic circuit is used to sense the temperature change brought about when a user places their fingers on a key without depressing the key. FIG. 4 shows a typical circuit for use with a thin film that changes its electrical resistance with temperature. A voltage comparator 304 and a constant current source 306 are used for detecting when the resistance and therefore temperature of the sensor 302 has changed significantly. A portion of this circuitry may be included in the key 300 or it can be centrally located.

While the present invention has been described with reference to the details of the embodiments of the invention shown in the drawing, these details are not intended to limit the scope of the invention as claimed in the appended claims.

What is claimed is:

1. Apparatus for implementing a compact portable computer system comprising:
    a keyboard including keyboard keys;
    proximity sensors included in the keyboard keys; said proximity sensors including a thermal sensor embedded in a key cap of said keyboard;
    a computer display disposed above and generally parallel to said keyboard;
    a pivot mechanism; and
    a pair of supporting arms, each said support arm coupled between said pivot mechanism and a respective one of said keyboard and said computer display for adjustably positioning said computer display above said keyboard.

2. Apparatus for implementing a compact portable computer system as recited in claim 1 includes an artificial hands/keyboard display program.

3. Apparatus for implementing a compact portable computer system as recited in claim 1 wherein said proximity sensors capture the users finger positions relative to the keys on said keyboard.

4. Apparatus for implementing a compact portable computer system as recited in claim 1 include a current source coupled to said thermal sensor.

5. Apparatus for implementing a compact portable computer system as recited in claim 4 include a comparator having a first input coupled to a reference and a second input coupled to a junction connection of said current source and said thermal sensor.

6. Apparatus for implementing a compact portable computer system as recited in claim 5 wherein said comparator provides a proximity output.

7. A method for implementing a compact portable computer system comprising the steps of:
    providing a generally horizontal keyboard;
    adjustably positioning a computer display above said keyboard utilizing a pivot mechanism and a pair of supporting arms with each said support arm coupled between said pivot mechanism and a respective one of said keyboard and said computer display;
    capturing respective users finger positions relative to the keys on the keyboard utilizing proximity thermal sensors, each embedded with respective key of a plurality of keys of said keyboard; and
    providing a respective comparator coupled to each of said proximity thermal sensors for comparing a signal from each of said proximity thermal sensors to a reference input.

8. A method for implementing a compact portable computer system as recited in claim 7 further includes the steps of positioning said computer display generally parallel to said generally horizontal keyboard.

9. A method for implementing a compact portable computer system as recited in claim 7 further includes the steps of generating a proximity signal at an output of said respective comparator.

* * * * *